United States Patent [19]

Ehrbar

[11] Patent Number: 5,385,359
[45] Date of Patent: Jan. 31, 1995

[54] STABILIZATION DEVICE FOR FRONT WHEEL DRIVE BICYCLES

[76] Inventor: James J. Ehrbar, 730 N. Racine Cir., Mesa, Ariz. 85205

[21] Appl. No.: 156,389

[22] Filed: Nov. 22, 1993

Related U.S. Application Data

[63] Continuation of Ser. No. 874,822, Apr. 28, 1992, abandoned.

[51] Int. Cl.⁶ .......................... B62M 1/12; B62M 3/16
[52] U.S. Cl. ..................................... 280/234; 280/250; 280/235
[58] Field of Search ....................... 280/242.1, 225, 224, 280/230, 232, 233, 234, 249, 250, 288.4, 235, 266

[56] References Cited

U.S. PATENT DOCUMENTS

| | | | |
|---|---|---|---|
| 551,814 | 12/1895 | East | 280/235 |
| 585,370 | 6/1897 | Trickler | 280/250 |
| 595,501 | 12/1897 | Stoops . | |
| 597,348 | 1/1898 | Winters | 280/234 |
| 641,926 | 1/1900 | Bollinger | 280/234 |
| 684,821 | 10/1901 | Hood | 280/235 |
| 3,193,305 | 7/1965 | Hendricks | 280/225 |
| 4,147,370 | 4/1979 | Lindsey, Jr. | 280/234 |
| 4,548,420 | 10/1985 | Patroni, Jr. | 280/224 |
| 4,685,692 | 8/1987 | Fullilove et al. | 280/234 |
| 4,773,662 | 9/1988 | Phillips | 280/234 |
| 5,082,302 | 1/1992 | Nacar | 280/234 |

FOREIGN PATENT DOCUMENTS

| | | | |
|---|---|---|---|
| 0524162 | 7/1919 | France | 280/233 |
| 0801759 | 1/1951 | Germany | 280/233 |
| 0306784 | 4/1933 | Italy | 280/230 |
| 1159826 | 6/1985 | U.S.S.R. | 280/288.4 |

*Primary Examiner*—Kenneth R. Rice
*Assistant Examiner*—F. Zeender
*Attorney, Agent, or Firm*—William E. Hein

[57] ABSTRACT

A dual drive bicycle having a hand crank mechanism for applying driving power to the front wheel of the bicycle includes a stabilizer bar attached to a hand crank mechanism frame, the stabilizer bar including a chest saddle against which the rider positions the chest area of his upper body during operation of the front wheel hand crank mechanism. The force applied by the rider's upper body against the chest saddle acts to maintain forward alignment of the front wheel of the bicycle to thereby greatly improve the stability of the bicycle. In addition, the stabilizer bar and chest saddle combination provides a resistance against which the rider works while operating the front wheel hand crank mechanism.

10 Claims, 1 Drawing Sheet

STABILIZATION DEVICE FOR FRONT WHEEL DRIVE BICYCLES

CROSS REFERENCE TO RELATED APPLICATION

This application is a continuation of application Ser. No. 07/874,822, filed Apr. 28, 1992, now abandoned.

BACKGROUND AND SUMMARY OF THE INVENTION

This invention relates generally to bicycles and more specifically to bicycles that include dual drive mechanisms that enable the rider to selectively apply driving power to the rear wheel by way of conventional foot pedals and to the front wheel by way of hand pedals.

The prior art is replete with dual drive bicycles. Exemplary of such bicycles are those described in U.S. Pat. Nos. 3,193,305, 4,147,370, 4,685,692, and 4,773,662. These prior art patents variously describe bicycles that, in addition to the conventional foot pedal rear wheel drive mechanism, include either hand crank or reciprocating lever mechanisms for driving the front wheel of those bicycles. All of the known dual drive bicycles suffer a major disadvantage in that the cranking or pedalling action of the riders arms causes a twisting motion to be transferred to the front wheel of the bicycle. This twisting motion introduces a considerable degree of instability that makes controlling the bicycle quite difficult. This deficiency probably explains why these prior art dual drive bicycles have never gained acceptance by bicycling enthusiasts.

It is therefore the principal object of the present invention to provide a dual drive bicycle in which use of the front wheel drive mechanism does not introduce a force that acts to create instability of the bicycle.

This and other objects are accomplished in accordance with the illustrated preferred embodiment of the present invention by providing a stabilizer bar attached to a hand crank mechanism frame, the stabilizer bar including a chest saddle against which the rider positions the chest area of his upper body during operation of the front wheel hand crank mechanism. The force applied by the rider's upper body against the chest saddle acts to maintain forward alignment of the front wheel of the bicycle to thereby greatly improve the stability of the bicycle. In addition, the stabilizer bar and chest saddle combination provides a resistance against which the rider works while operating the front wheel hand crank mechanism.

DETAILED DESCRIPTION OF THE PREFERRED EMBODIMENT

Figure 1:
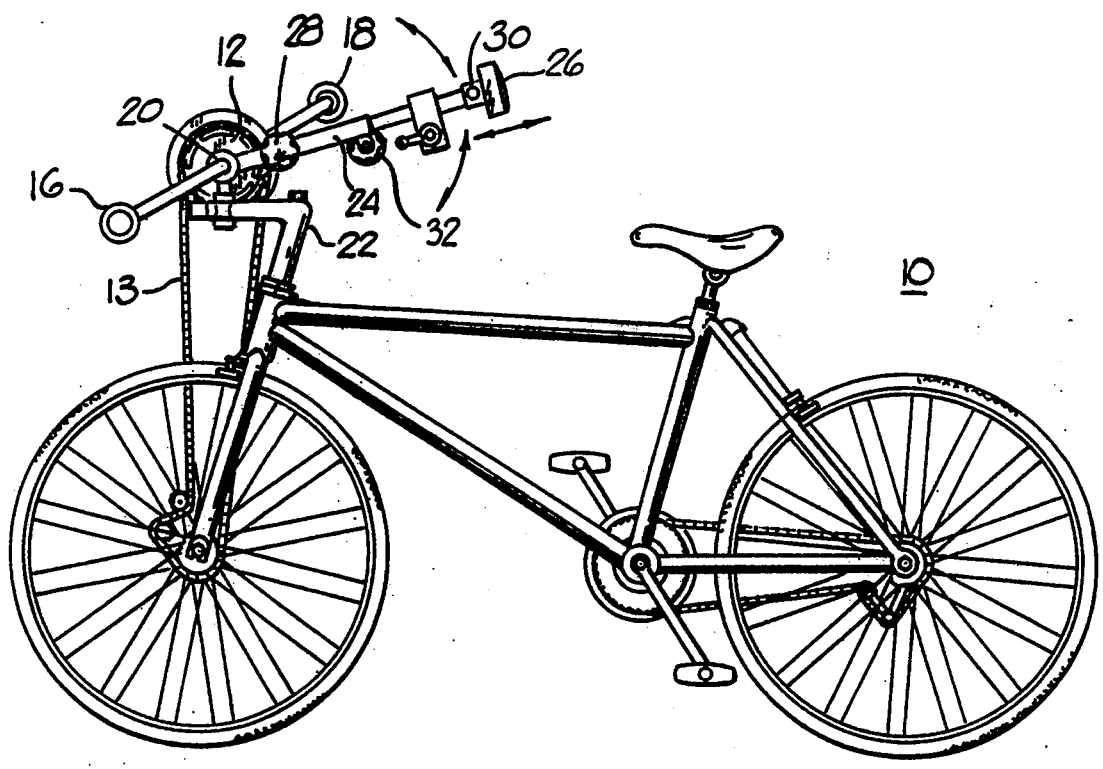
FIG. 1 is a pictorial diagram of a dual drive bicycle equipped with the stabilizer bar and chest saddle of the present invention.
Figure 2:
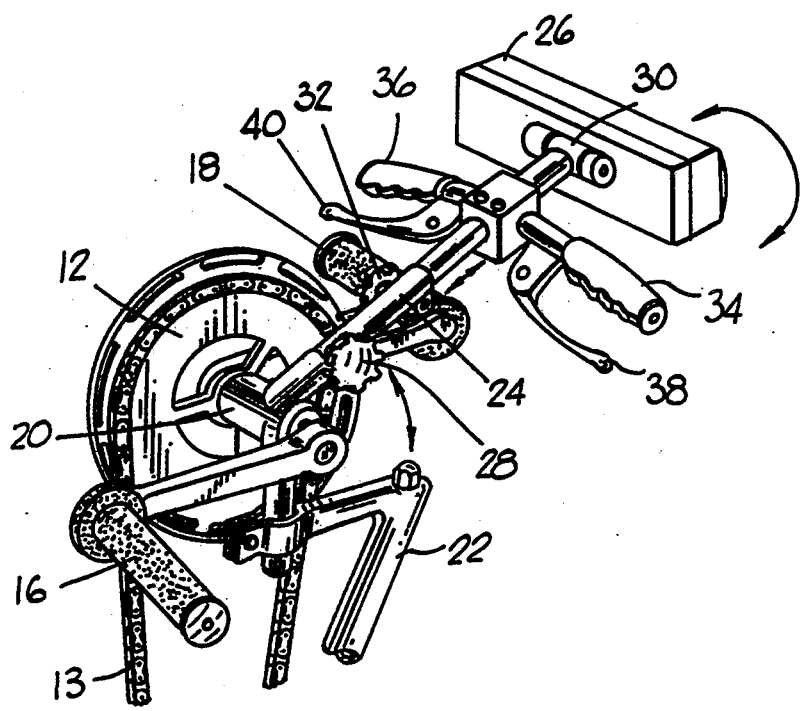
FIG. 2 is a detailed pictorial diagram of the front wheel hand crank mechanism, including the stabilizer bar and chest saddle, of the dual drive bicycle illustrated in FIG. 1.

Referring now to FIGS. 1 and 2, there is shown a dual drive bicycle 10 that includes a conventional foot pedal rear wheel drive mechanism. A similar drive mechanism is provided to enable the rider to also apply driving power to the front wheel of the bicycle through use of his or her arms and hands. The front wheel drive mechanism includes a conventional chain drive sprocket 12 driven by a hand crank mechanism that includes left and right crank handles 16 and 18, respectively. Left and right crank handles 16, 18 are preferably closely spaced laterally, while maintaining clearance from the bicycle frame, to thereby minimize the twisting force produced during operation of the hand crank mechanism. Chain drive sprocket 12 conventionally couples a drive chain 13 to the front wheel of bicycle 10, either directly or through a conventional gear selection derailleur mechanism. The hand crank mechanism includes a conventional bearing frame 20 that is attached to the front wheel steering column 22 of bicycle 10. It is important to position the hand crank mechanism such that the centerline of rotation of crank handles 16, 18 is in close proximity to the centerline of the front wheel steering column 22 to thereby minimize the transfer of any twisting force resulting from operation of the hand crank mechanism to the front wheel steering column 22.

A stabilizer bar 24 is attached to the hand crank mechanism and extends rearward therefrom. A chest saddle 26, appropriately formed and padded to receive the rider's chest area, is attached to the rearward end of stabilizer bar 24. A conventional thumbwheel adjustment means 28 permits upward and downward pivotal adjustment of stabilizer bar 24. Similar adjustment means 30 and 32 allow chest saddle 26 to be turned, as well as either retracted or extended to accommodate the preferred position of the rider. A pair of adjustable handlebars 34, 36 are positioned intermediate the length of stabilizer bar 24 for use by the rider when the hand crank mechanism is not being used. Handlebars 34, 36 may be adjusted to be closer to or further from the rider by sliding them along stabilizer bar 24. Brake controls 38, 40 are associated with handlebars 34, 36 for conventionally controlling front and rear wheel caliper brakes. Alternatively, a conventional coaster brake may be employed.

The front and rear wheel drives for bicycle 10 may be any combination of conventional fixed or multiple speed gear selection drives. In operation, the rider of the dual drive bicycle 10 of the present invention leans forward so that the chest area of his upper body is forced against chest saddle 26 during the time that the rider is using his or her arms and hands to operate crank handles 16, 18 to apply driving power to the front wheel of bicycle 10. As stated above, the force of the rider's upper body against chest saddle 26 maintains forward alignment of the front wheel of bicycle 10 and minimizes the transfer of any twisting motion from the hand crank mechanism to the front wheel, thereby greatly improving the stability of bicycle 10.

I claim:

1. A front wheel drive bicycle comprising:
    a main frame;
    a rear wheel rotatably coupled to the main frame;
    pedal drive means for driving the rear wheel;
    a front wheel steering column journaled to the main frame having a longitudinal axis such that the steering column may be turned with respect to the main frame about said axis for steering the bicycle;
    a front wheel rotatably coupled to the front wheel steering column;
    a hand crank drive mechanism attached to the front wheel steering column and coupled to the front wheel for enabling the rider to steer the front wheel and to apply driving power thereto, the hand crank drive mechanism including a bearing frame mounted forward of the longitudinal axis about which said steering column may be turned, said bearing frame supporting a pair of hand cranks and an associated drive rotation, said hand cranks being arcuately spaced 180 degrees apart from each other with respect to said drive sprocket; and a stabilizer bar connected to the bearing frame and extending rearward from the hand crank drive mechanism, the stabilizer bar having a chest pad adjustably mounted at a distal end thereof for receiving a forward force applied by the rider's chest to thereby counteract torsional forces produced by reciprocating motion of the rider's arms while operating the hand crank drive mechanism.

2. A front wheel drive bicycle as in claim 1 further comprising adjustment means for adjusting the length of the stabilizer bar to thereby move the chest saddle forward or backward.

3. A front wheel drive bicycle as in claim 1 further comprising handlebar means adjustably positioned intermediate the length of the stabilizer bar for gripping by the rider when the hand crank drive mechanism is not being operated.

4. A front wheel drive bicycle as in claim 3 further comprising brake means coupled to the front wheel and brake control means, coupled to the handlebar means, for actuation by the rider.

5. A front wheel drive bicycle as in claim 1 further comprising adjustment means for adjusting the angle at which the stabilizer bar extends rearward from the hand crank drive mechanism.

6. A front wheel drive bicycle comprising:

a main frame;

a rear wheel rotatably coupled to the main frame;

a front wheel steering column journaled to the main frame having a longitudinal axis such that the steering column may be turned with respect to the main frame about said axis for steering the bicycle;

a front wheel rotatably coupled to the front wheel steering column;

a hand crank drive mechanism attached to the front wheel steering column and coupled to the front wheel for enabling the rider to steer the front wheel and to apply driving power thereto, the hand crank drive mechanism including a bearing frame mounted forward of the longitudinal axis about which said steering column may be turned, said bearing frame supporting a pair of hand cranks and an associated drive sprocket for rotation, said hand cranks being arcuately spaced 180 degrees apart from each other with respect to said drive sprocket; and a stabilizer bar connected to the bearing frame and extending rearward from the hand crank drive mechanism, the stabilizer bar having a chest pad adjustably mounted at a distal end thereof for receiving a forward force applied by the rider's chest to thereby counteract torsional forces produced by reciprocating motion of the rider's arms while operating the hand crank drive mechanism.

7. A front wheel drive bicycle as in claim 6 further comprising adjustment means for adjusting the length of the stabilizer bar to thereby move the chest saddle forward or backward.

8. A front wheel drive bicycle as in claim 6 further comprising handlebar means adjustably positioned intermediate the length of the stabilizer bar for gripping by the rider when the hand crank drive mechanism is not being operated.

9. A front wheel drive bicycle as in claim 8 further comprising brake means coupled to the front wheel and brake control means, coupled to the handlebar means, for actuation by the rider.

10. A front wheel drive bicycle as in claim 6 further comprising adjustment means for adjusting the angle at which the stabilizer bar extends rearward from the hand crank drive mechanism.

* * * * *